UNITED STATES PATENT OFFICE.

JACOB SELGRATH, OF POTTSVILLE, PENNSYLVANIA.

IMPROVEMENT IN LUBRICATING COMPOUNDS.

Specification forming part of Letters Patent No. 8,176, dated June 24, 1851.

*To all whom it may concern:*

Be it known that I, JACOB SELGRATH, of Pottsville, in the county of Schuylkill and State of Pennsylvania, have discovered a new and useful composition of matter which is applied as a substitute for oil or other compounds as an anti-attrition to the lubrication of the joints of machinery and for other purposes; and I do hereby declare that the following is a full, clear, and exact description of the manner of compounding and using the same.

This lubricator consists in the mixture of tallow, rosin, spirits of turpentine, and animal or vegetable oil, which may be mixed in various proportions. I have, however, found the following proportions of the ingredients to answer well in the manufacture of the compound— viz., three pounds of tallow, two pounds of rosin, half pint of oil, and half pint of spirits of turpentine.

To prepare the compound I first melt the tallow in any convenient vessel, then dissolve the rosin therein, keeping it constantly in agitation by stirring, that the ingredients may be equally diffused. This mixture is then taken from the fire, and when partly cooled the oil and spirits of turpentine are added to it and thoroughly stirred together until the mixture shall have assumed a homogeneous character. The stirring must be continued until the mixture is entirely cool, when it may be stowed away in barrels or other convenient vessels, ready for use.

This compound, when applied to machinery, is used in the same manner as oil or other lubricating compounds.

Having thus described the mode in which my anti-attrition is compounded and used, what I claim therein as new, and desire to secure by Letters Patent, is—

The combination of ingredients herein described, whether the proportions be the same as herein set forth or varied to any extent that the same may admit of without changing the peculiar character of the compound as a lubricator.

In testimony whereof I have hereunto set my hand this 1st day of February, A. D. 1851.

J. SELGRATH.

Witnesses:
 J. S. SMITH,
 CHARLES W. PITMAN.